Figure 1:
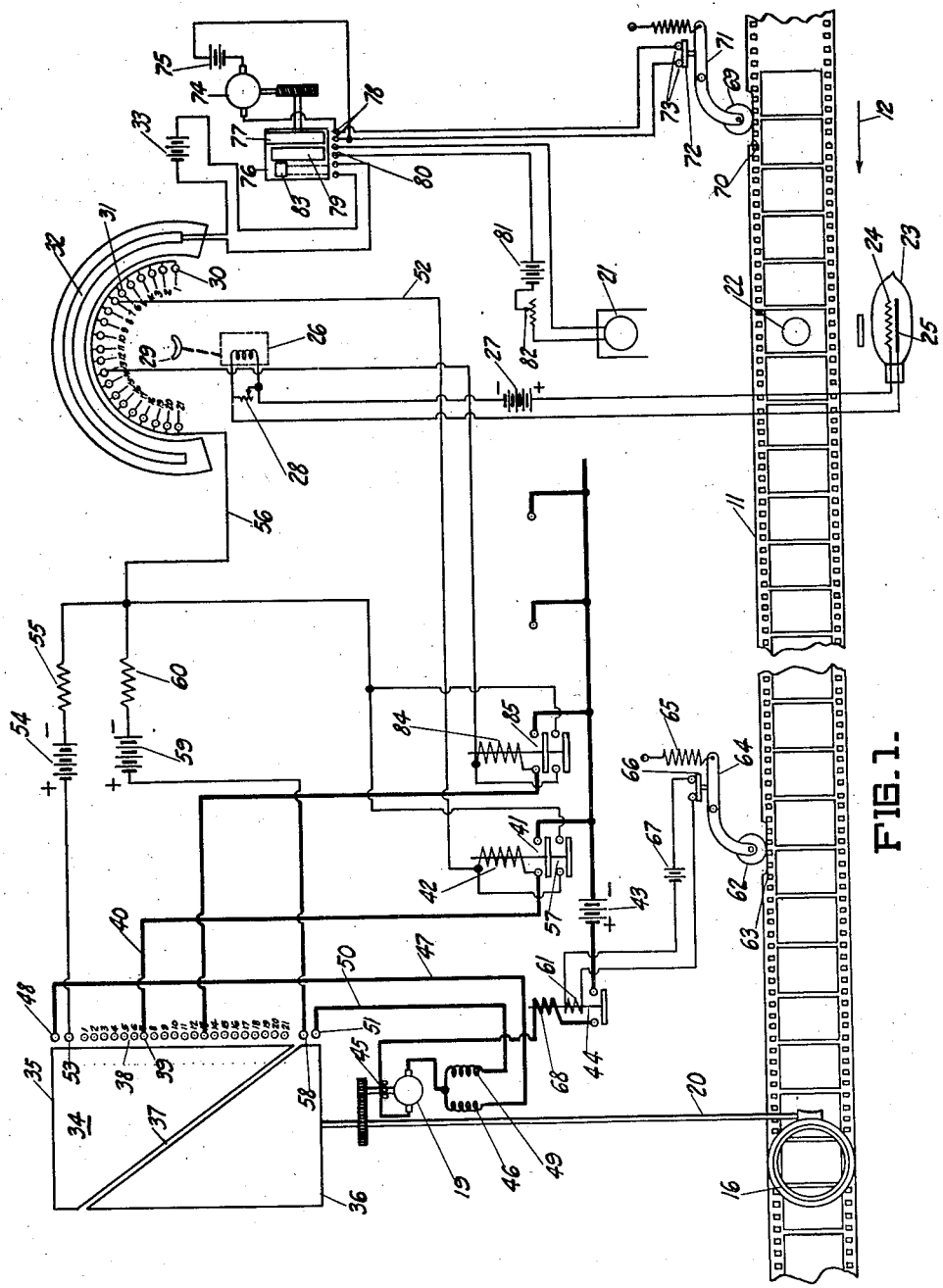

May 3, 1932.  D. A. WHITSON ET AL  1,856,859
AUTOMATIC PRINTER
Filed Dec. 27, 1927    2 Sheets-Sheet 1

INVENTORS
Delmar A. Whitson
Lewis W. Physioc
Frederick F. Brush
BY John Flam
THEIR ATTORNEY May 3, 1932.  D. A. WHITSON ET AL  1,856,859
AUTOMATIC PRINTER
Filed Dec. 27, 1927   2 Sheets-Sheet 2

INVENTORS
Delmar A. Whitson
Lewis W. Physioc
Frederick F. Brush
BY
THEIR ATTORNEY Patented May 3, 1932

1,856,859

UNITED STATES PATENT OFFICE

DELMAR A. WHITSON, LEWIS W. PHYSIOC, AND FREDERICK F. BRUSH, OF LOS ANGELES, CALIFORNIA

AUTOMATIC PRINTER

Application filed December 27, 1927. Serial No. 242,775.

This invention relates to an apparatus for making prints from photographic translucencies, such as motion picture film negatives.

In a prior application, Serial Number 225,365, filed October 10, 1927, in the name of Whitson and Physioc, there is discussed the various factors surrounding the production of motion picture negatives. In that discussion, it was shown that if the usual negative were printed uniformly so that all scenes would receive the same intensity of printing, then at least some of the print would be inartistically illuminated on the screen. In order to obviate this, a scheme is described in the said prior application whereby the translucence of the film negative is used as a basis for determining the intensity of printing. By "translucence" is meant the ability of the film to pass light or other forms of radiant energy.

In the prior application, the translucence of portions of scenes was compared with a standard translucence, the relative translucence noted, and the film positive was printed in accordance with said notations. It is our present object to provide an automatic printing apparatus that varies the intensity of printing (as by varying an iris opening through which the illumination for printing is transmitted) in response to the variations in the negative translucency. Thus the negative is first subjected to a translucency measuring device, and this device then actuates the iris or other printing intensity controller in accordance with the measurements. The positive film is then fed to the printer with the negative so as to be subjected to this predetermined intensity. Of course, when an opening is varied to vary the printing intensity, it is understood that the iris is used in conjunction with a lens system so that its opening affects the amount of light passed and not the dispersion thereof. Furthermore, the light intensity can be controlled alternatively by varying a resistor in the lamp circuit.

It is of course possible to control the printing intensity continuously in accordance with the continuous variations in translucence of the negative; this would lend itself very easily to a practical embodiment. The negative could be run through the machine so as to subject a definite continuous width of the film to the measuring operation, or else indications can be taken in steps of one frame each, the essential portions of the frame being exposed, so as to provide an averaging continuous effect. Although blank spaces might be included between frames, yet this can readily be compensated by appropriate calibration of the machine.

It is accordingly another object of our invention to make it possible to print a negative by moving it continuously or in steps past a measuring and a printing station.

Our invention, however, is not, in its broadest aspect, to be limited to a continuous measurement; for, as will appear later on in this description, it is quite feasible to subject only selected representative portions of each scene, or of the negative as a whole, and to set the printing intensity for those parts of the negative represented by these selected portions in accordance with the translucency measurements. Thus for example, each scene can be taken as a unit for printing, and a selected portion of each scene only, need to be taken as a representative for the printing of the whole scene. This procedure is entirely practicable, because there is no likelihood of substantial variation in translucency in a scene of the negative.

Our invention possesses many other advantages, and has other objects which may be made more easily apparent from a consideration of one embodiment of our invention. For this purpose we have shown a form in the drawings accompanying and forming part of the present specification. We shall now proceed to describe this form in detail, which illustrates the general principles of our invention; but it is to be understood that this detailed description is not to be taken in a limiting sense, since the scope of our invention is best defined by the appended claims.

Figure 2:
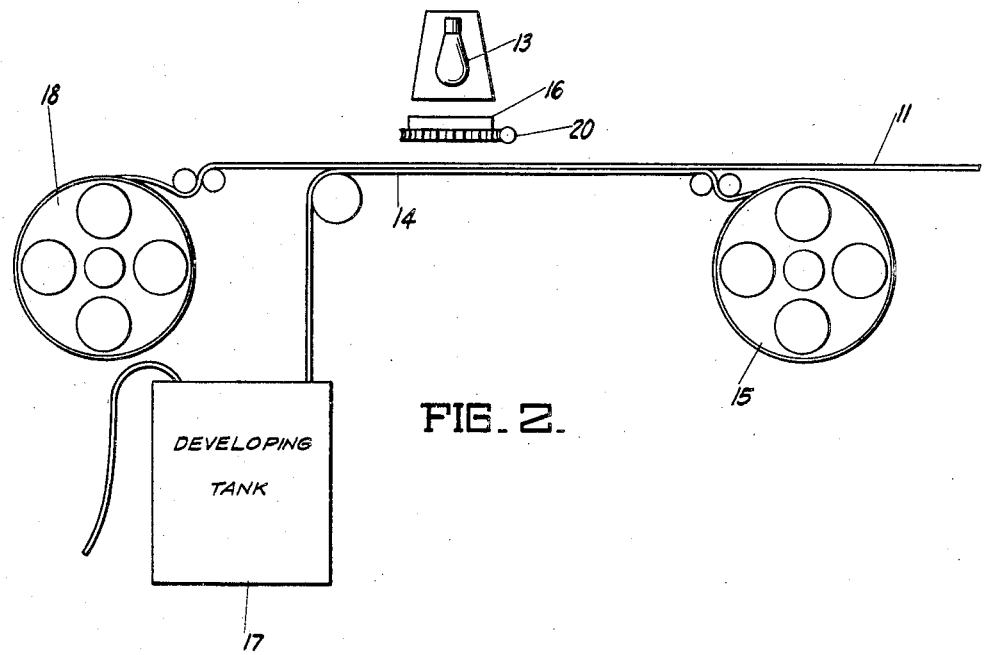

Referring to the drawings:

Figure 1 is a diagrammatic view of one embodiment of a device for automatically printing the films; and Fig. 2 is a diagrammatic view showing the general arrangement of the printing device.

The negative 11 to be printed is shown as extending from the right to the left, and is movable toward the left as indicated by arrow 12. This movement is so regulated that as it passes beneath the source of light 13 (Fig. 2), the unexposed positive film 14 is moved in unison with film 11 and below it, from a reel 15 and is subjected to the light that passes through iris 16 and film 11. This movement occurs in a dark space except for the illumination from source 13; and the printed film can be subjected to development and further treatment, as indicated diagrammatically by tank 17. The negative film 11 can be reeled onto a take-up reel 18.

In order to secure a positive print of substantially uniform translucency, the opening of iris 16 is varied in accordance with the translucency of the negative 11. This can be accomplished automatically in a large number of ways. For example, a small motor 19 can be energized to rotate in one direction or the other to move worm shaft 20 that actuates the iris 16. The extent of movement of motor 19 in either direction can be determined in accordance with the measurements of the translucency of the negative 11. Thus for example, a source of radiant energy, such as light 21 of constant effective intensity can be used to transmit light through a controllable opening 22 and negative 11 to affect a light sensitive device 23. The variations in the amount of light that reaches device 23 can be used to affect motor 19.

Device 23 can be a photoelectric cell of any well-known type, having electrodes 24 and 25. The light intensity affects the electrical conductivity of the space between these electrodes, whereby a current responsive device 26 is actuated in accordance with the variations in the electrode circuit, which includes not only the devices 23 and 26, but also a source of potential 27. This source impresses a negative potential on cathode 25. Furthermore, a variable calibrating shunt resistance 28 can be used to control the degree of movement of the galvanometer or current responsive device 26. All these elements have been quite carefully detailed in the prior application hereinbefore identified.

Galvanometer 26 can affect the control of motor 19 in accordance with its deflection. By way of example, the galvanometer can be connected to a reflecting mirror 29 so as to rotate it and to cause it to throw a light on any one of a number of light sensitive devices such as 30, 31, that are arranged in a circle concentric with the rotation of the mirror. The source of light can be provided back of the devices 30, 31, and is indicated as an arcuate strip 32. It can be a series of lamps lighted from a source 33, or its equivalent. Devices 30, 31 can be selenium cells, their sluggish response being of no great moment in their present application. There are twenty-one of them in all, numbered consecutively, and corresponding to the number of degrees of translucencies.

Let us assume that the translucency measured at the moment corresponds to such deflection of galvanometer 26 as to cause mirror 29 to reflect light on cell number 7. This cell then completes a relay circuit that operates motor 19 until a definite movement is secured corresponding to this deflection. For this purpose, a follow-up mechanism is geared or otherwise connected to motor 19; for example, a drum 34 having two contact segments 35 and 36, rotatable by worm shaft 20. These segments are separated by a diagonal space 37 which can be filled with insulation; and of course it is understood that the drum 34 is shown in development, the axis of the drum being coincident with that of shaft 20. The arrangement is such that the motor 19 is deenergized whenever the drum 34 has rotated so as to bring the insulation space opposite the motor control contact.

The motor rotation can thus be controlled in this manner; and for this purpose, there are a number of axially displaced contacts such as 38, 39, corresponding to devices 30, 31, and likewise numbered from 1 to 21. The motor circuit 19 may be completed when any one of these contacts rests on either segment 35 or 36, and the direction of rotation depends upon which segment the contact rests on. Thus considering contact No. 7 which is marked with reference character 39; if this contact rests on segment 35, the circuit for motor 19 can be traced as follows: contact No. 7, lead 40, contacts 41 of a relay 42, a source of electrical energy 43, contacts 44, brake coil 45, for releasing the solenoid brakes on the motor, the armature of motor 19, field coil 46, connection 47, contact 48, segment 35, back to contact No. 7.

The motor 19 will then rotate until the space 37 comes opposite contact No. 7, where the motor circuit will be opened. In case contact No. 7 be on segment 36, the motor 19 will be rotated in the opposite direction, for then field coil 49 will be energized in place of coil 46; and these two coils are wound in opposite directions, so as to reverse the field polarity and thus reverse the armature rotation. Under such circumstances, the motor circuit can be traced as follows: contact No. 7, lead 40, contacts 41, source 43, contacts 44, coil 45, armature of motor 19, field coil 49, connection 50, contact 51, segment 36, back to contact No. 7. The motor 19 then rotates until the space 37 disconnects the circuit.

From the foregoing, it is evident that the position of drum 34, and therefore of iris 16, is controlled by the space relation of the active contact of the series from 1 to 21, to the drum 34. Thus if contact No. 1 is active, the motor 19 will be rotated to one extreme of its range, because contact No. 1 cooperates with the upper end of diagonal space 37; and on the contrary, if contact No. 21 be active, the motor 19 will be rotated to the other extreme of its range, because that contact cooperates with the lower end of space 37.

The contacts 41, which also control the motor circuit, are in turn controlled by the corresponding selenium cell 7. Thus when this cell is active, relay 42 is energized to close contacts 41; furthermore the arrangement can easily be made such that when the motor circuit opens, the relay circuit also opens. Thus the circuit of relay 41, if contract No. 7 is on segment 35, can be traced as follows: cell No. 7, connection 52, relay coil 42, connection 40, contact No. 7, segment 35, contact 53, a source of electrical energy such as battery 54, ballast resistance 55, and common connection 56 to all of the cells 30, 31. As soon as this circuit is energized, a pair of holding contacts 57 are connected by the relay, these contacts bridging the cell No. 7, whereby even after the light leaves this cell, the motor circuit stays complete until it has accomplished its movement.

In case contact No. 7 should happen to be on segment 36, the circuit for relay 42 would be energized as follows: cell No. 7, connection 52, relay 42, connection 40, contact No. 7, segment 36, contact 58, a source of electrical energy such as battery 59, ballast resistance 60, and common connection 56. It is thus seen that the relay 42 is first energized by the aid of cell No. 7, and stays energized (by the aid of contact No. 7 and holding contacts 57) until the drum 37 moves to the desired position corresponding to the desired opening of iris 16. Two batteries 54 and 59 must be used, one for each segment 35, 36 to prevent short-circuiting of the field coils 46, 49, through these segments. Furthermore, these batteries, are each of the same potential value as battery 43, and therefore have no appreciable effect on any circuit that can be traced through these batteries if the polarities are as indicated. The ballast resistances 55 and 60 ensure that no appreciable current can flow through the inactive field winding when the other is energized, through a circuit shunting the active winding.

As thus far described, it is evident that motor 19 will respond to each change of translucency of negative 11, and there is a likelihood that it will not be idle for any substantial period. Under such circumstances, the printing station should be as close as practicable to the testing station so that the measurement of translucency and the printing take place substantially coincidentally. However, in some instances it may be advisable to adjust iris 16 only once during a length of film; for example, once for each scene of the negative.

It is for this purpose that contacts 44 in the motor circuit are provided. These contacts can be controlled once during the travel of each scene to bring the iris 16 to the right opening, as for example by the aid of relay coil 61 that is energized whenever roller 62 drops into a notch 63 in the edge of the film 11 and placed so that the beginning of the scene to be printed is just arriving under iris 16 when the roller 62 drops into it. This roller is carried by a pivoted lever 64 that is urged toward the notch as by spring 65. It carries a bridging contact 66 that completes the circuit for coil 61 through a source 67 whenever notch 63 passes by roller 61. Once the motor circuit is energized, it holds contacts 44 closed by series coil 68 in the circuit.

It is thus seen that the motor 19 is actuated once per scene; in between these actuations, one of a series of relays, such as 42 is kept energized until the next notch 63 passes the roller 62. In order to set iris 16 in accordance with the translucence of a definite small portion of the scene, rather than to determine this setting only by the end of the scene, we provide an arrangement whereby one of the cells 30, 31 is energized for a limited time only, corresponding to the passage of this representative portion of the scene above the photoelectric cell 23.

This can be accomplished during passage of notch 63, beneath a roller 69 associated with the testing mechanism. In Fig. 1, roller 69 is shown as cooperating with a notch 70 immediately following notch 63 in film 11; therefore the testing station is ready to proceed with the testing of a portion of that scene which follows the scene being printed. Roller 69 is mounted on lever 71, carrying the bridging contact 72. When this contact bridges contacts 73, apparatus is set into operation that ultimately completes the circuit for the source of illumination 32, this source being at other times deenergized.

For this purpose, contacts 73 complete the circuit of a small motor 74 through a source of electrical energy such as battery 75 so long as roller 69 stays depressed. This motor, during such depressions, starts rotating a drum 76 that carries a contact segment 77 extending almost entirely around the drum. This segment cooperates with stationary contacts 78 to complete the motor circuit even after roller 69 is raised, and in such a way that the motor 74 makes substantially a complete revolution before the contacts 78 are opened. This revolution takes place during an interval that is less than that required for even the shortest stretch of film between notches such as 63, 70 to travel past the device 23. During this revolution, the source of illumination 21 is energized, as by the aid of segment 79 on drum 76, bridging contacts 80. These contacts control a circuit through source 21, a source 81 of electrical energy, and an adjustable resistance 82.

The drum 76 also carries a much shorter segment 83 which serves to complete, but only for a short time, the circuit through the source of illumination 32 and the battery 33. Thus it is only at that time that mirror 29 receives any light that can be reflected on one of the cells 30, 31.

It is of course understood that there are as many relays, such as 42, as there are selenium cells 30, 31, although only one such additional relay 84 is shown. These relays are all interconnected with their respective cells and contacts just as relay 42 is connected, so as to complete the motor circuit through contacts such as 41, 85.

It is now possible to summarize the operation of the entire system. While no notch passes roller 69, the measuring or testing station is inactive; and while no notch passes roller 62, the iris 16 remains at its former setting. As soon as a notch 70 reaches roller 69, the motor 74 rotates drum 76 through a revolution; light 21 is energized; for a short time during this energization, light 32 is also energized. One of the twenty-one cells 30, 31 is excited, say cell No. 13. This causes relay 84 to be energized, and the motor circuit is completed and held completed except for contacts 44. These contacts are open until the same notch 70 passes roller 62; then the motor 19 is energized to bring iris 16 to an opening corresponding to the position of the excited cell No. 13. As soon as this iris is so set, the circuit through the motor opens at space 37 on drum 34. Roller 62 is so placed that this occurs at the beginning of that scene which was just previously tested by the testing station. After motor 19 is stopped, one or other of the relays is again energized by the testing station, to prepare the circuits so that the next notch such as 70 will cause the motor to be actuated again to set the iris in accordance with the test.

It is thus seen that as the notch passes the testing station, it serves to set the circuits for the printing station; then as it passes the printing station, it causes the energization of these circuits to bring the iris opening into conformity with the test that was previously made.

It is evident that equivalent mechanical schemes could be substituted for that described. The important point is that the intensity of printing is determined automatically in response to the variations in translucency of at least a portion of the film passing through the machine.

We claim:

1. In combination, means for testing the translucency of at least a portion of a motion picture negative, a plurality of means arranged selectively to respond to the operation of the testing means, means for printing from said negative by passing radiant energy through the negative, and means operated by said selectively responsive means for determining the degree of printing intensity.

2. In combination, a station for determining the relative translucency of at least a portion of a motion picture negative, a station for printing from said negative, means acting in accordance with the operation of said translucency determining station for varying the intensity of printing, and means actuated by the movement of the negative to a definite location for initiating the action of the intensity varying means.

3. In a printing device, an adjustable means for varying the intensity of printing, a motor for adjusting said means, a circuit for energizing the motor, and means operated by the movement of the motor to open said circuit.

4. In a printing device, an adjustable means for varying the intensity of printing, a motor for adjusting said means, a circuit for energizing the motor, and operated by the movement of the motor to open said circuit, and means selecting the amount of permissible movement of said motor.

5. In a printing device, an adjustable means for varying the intensity of printing, a motor for adjusting said means, a circuit for energizing the motor, and operated by the movement of the motor to open said circuit, and means responsive to the degree of translucency of a motion picture negative for determining the amount of motion of said motor.

6. In a printing device, an adjustable means for varying the intensity of printing, an actuator for said means, and means operated in response to the movement of said actuator for limiting its movement.

7. In a printing device, an adjustable means for varying the intensity of printing, an actuator for said means, means operated in response to the movement of said actuator for limiting its movement, and means responsive to the degree of translucency of a motion picture negative for determining the amount of said movement.

8. In a printing device, movable means for varying the intensity of printing, a control device connected to said means and movable in unison therewith, a motor for moving said means, a plurality of contacts cooperating with said control device to energize said motor through parallel paths, contacts in each of said parallel paths, said control device and cooperating contacts being selective to actuate the motor to an extent dependent upon the contact chosen, and means for controlling any one of the set of contacts in the parallel paths, whereby the degree of movement is determined.

9. In a printing device, movable means for varying the intensity of printing, a control device connected to said means and movable in unison therewith, a motor for moving said means, a plurality of contacts cooperating with said control device to energize said motor through parallel paths, contacts in each of said parallel paths, said control device and cooperating contacts being selective to actuate the motor to an extent dependent upon the contact chosen, and means for controlling any one of the set of contacts in the parallel paths, whereby the degree of movement is determined, comprising means responsive to the degree of translucency of a motion picture negative.

10. In a printing device, movable means controlling the intensity of printing, a plurality of parallel circuits arranged independently to control said means, and means actuated in unison with said movable means for opening the parallel circuits one after another, whereby when the chosen controlling parallel circuit is opened, the movable means comes to rest at a point determined by the choice of said parallel controlling circuit.

11. In a printing device, movable means controlling the intensity of printing, a plurality of parallel circuits arranged independently to control said means, means actuated in unison with said movable means for opening the parallel circuits one after another, whereby when the chosen controlling parallel circuit is opened, the movable means comes to rest at a point determined by the choice of said parallel controlling circuit, and a translucency measuring device arranged to choose one of said paths in accordance with the translucency of a motion picture negative.

12. In combination, a station for testing the translucency of a motion picture negative, means for printing from said negative by passing radiant energy through the negative and means for adjusting the degree of printing intensity, including a series of devices responsive to radiant energy, and means operated in response to variations in translucency determined at the said testing station for positioning a beam of radiant energy upon one of said series.

13. In a device of the character described, a film testing station, a film printing station spaced from the testing station, means for determining the intensity of printing at the printing station by the film testing station, and means whereby the setting of the printing intensity is accomplished only when the tested portion of the film reaches the printing station.

14. The combination as set forth in claim 13, in which the printing intensity setting means includes a circuit controller operated by the advance of the film.

15. The combination as set forth in claim 13, in which the means whereby the printing intensity is set, includes means imposing a limit on the printing intensity setting, operated in response to the operation of the testing station, and means for adjusting the printing intensity, operated in response to the arrival of the tested portion of the film at the printing station.

16. In a device of the character described, a film testing station, a film printing station, an actuator at the printing station for adjusting the printing intensity, means responsive to the testing of the film for predetermining the extent of movement of the actuator, and means operated in response to the movement of the tested portion of the film to the printing station for moving the actuator to the predetermined extent.

17. In a device of the character described, a film testing station, a film printing station, an actuator at the printing station for adjusting the printing intensity, means responsive to the testing of the film for predetermining the extent of movement of the actuator, a circuit for energizing the actuator, and means controlling said circuit in response to the arrival of a definite part of the film at the printing station.

18. The combination as set forth in claim 16, in which the means for predetermining the extent of actuator movement includes a follow-up device and a circuit controlling the actuator and in turn controlled by the follow-up device.

19. The combination as set forth in claim 17, in which the means for predetermining the extent of actuator movement includes a follow-up device that is included in the energizing circuit.

20. In a printing device, movable means for varying the intensity of printing, a reversible motor for operating said means, means selectively operating said motor in either direction for moving said means, and means for testing the negative film translucence and for initiating the action of the selectively operating means.

In testimony whereof we have hereunto set our hands.

DELMAR A. WHITSON.
LEWIS W. PHYSIOC.
FREDERICK F. BRUSH.